Figure 1:
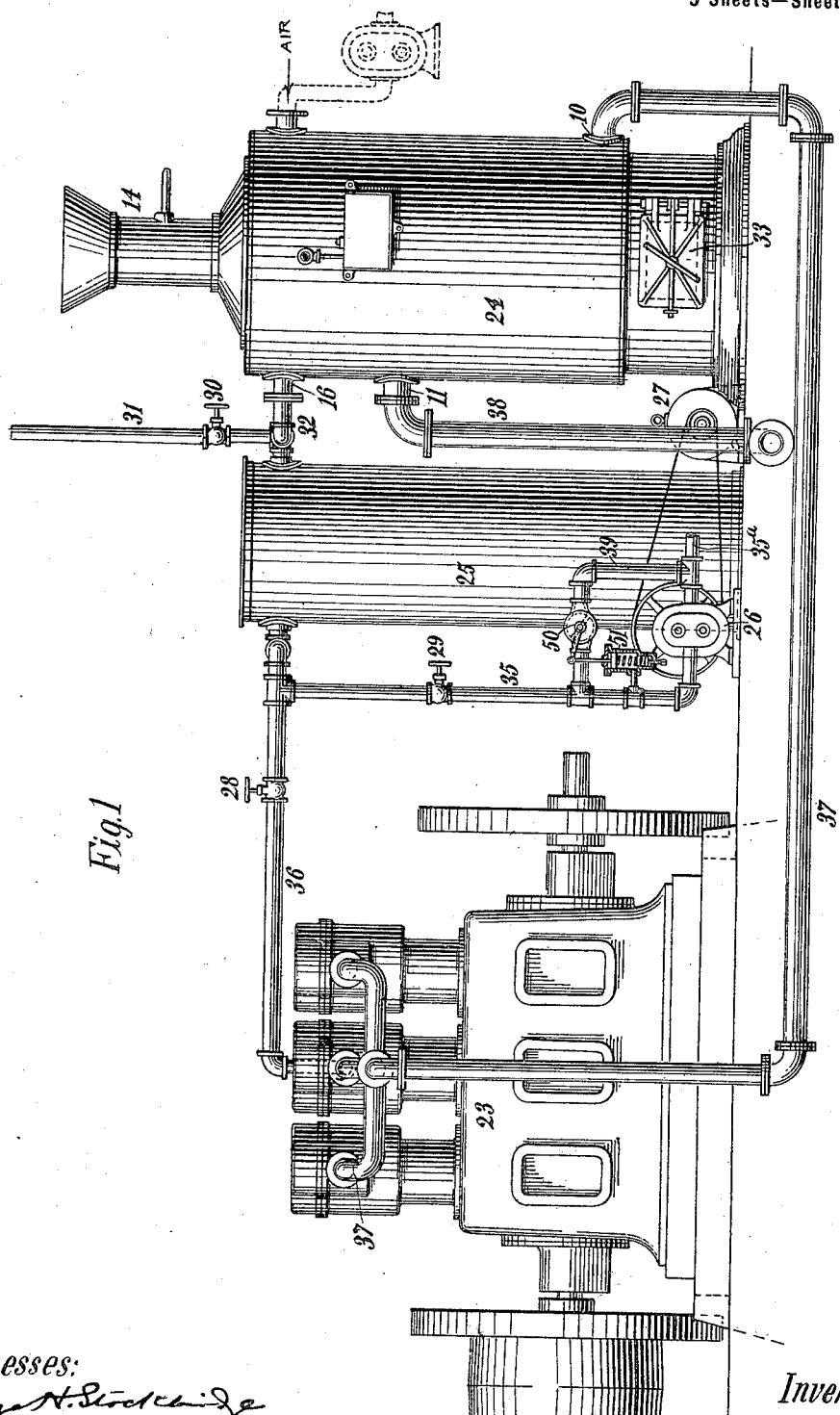

No. 680,827. Patented Aug. 20, 1901.
G. WESTINGHOUSE.
GAS PRODUCER.
(Application filed Jan. 15, 1901.)
(No Model.) 5 Sheets—Sheet 1.

Witnesses:
George H. Stockbridge
Wm. H. Capel.

Inventor
George Westinghouse,
by Charles A. Terry Atty

No. 680,827. Patented Aug. 20, 1901.
G. WESTINGHOUSE.
GAS PRODUCER.
(Application filed Jan 15, 1901.)

(No Model.) 5 Sheets—Sheet 2.

Witnesses:
George H. Stokey
Wm. H. Capel

Inventor
George Westinghouse
by Charles A. Terry Att'y

No. 680,827. Patented Aug. 20, 1901.
G. WESTINGHOUSE.
GAS PRODUCER.
(Application filed Jan. 15, 1901.)
(No Model.) 5 Sheets—Sheet 3.
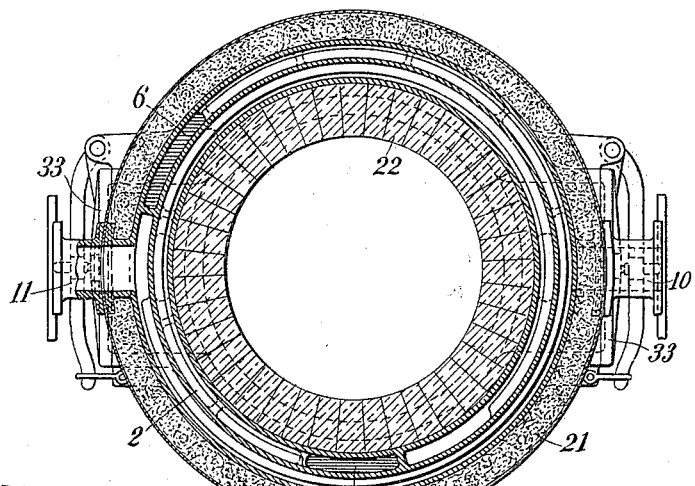
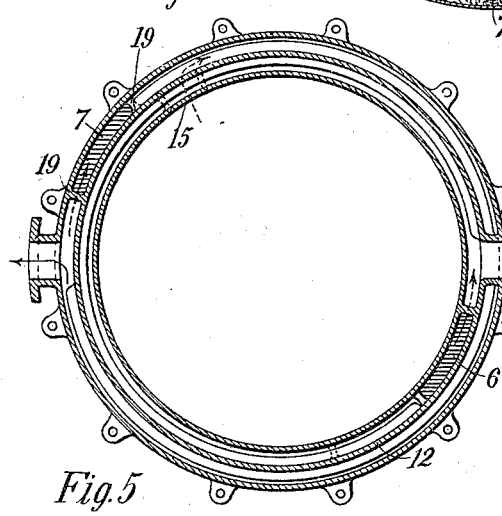
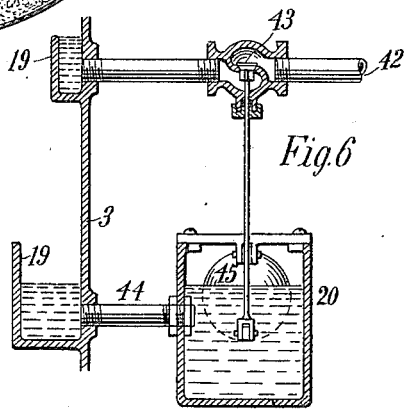
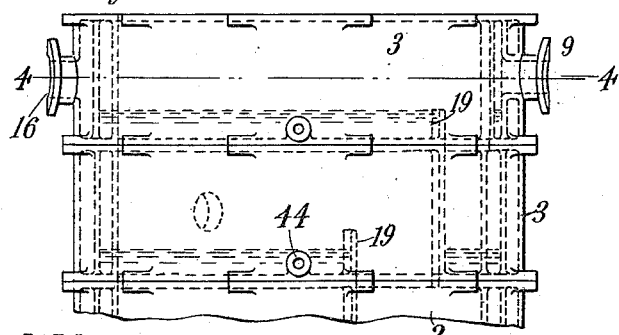
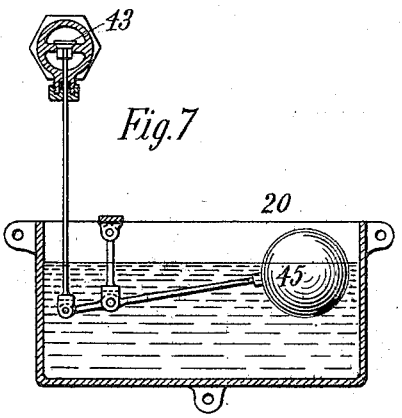
Witnesses:
George H. Stockbridge
Wm. H. Capel.
George Westinghouse, Inventor
by Charles A. Terry, Att'y No. 680,827. Patented Aug. 20, 1901.
G. WESTINGHOUSE.
GAS PRODUCER.
(Application filed Jan. 15, 1901.)
(No Model.) 5 Sheets—Sheet 4.
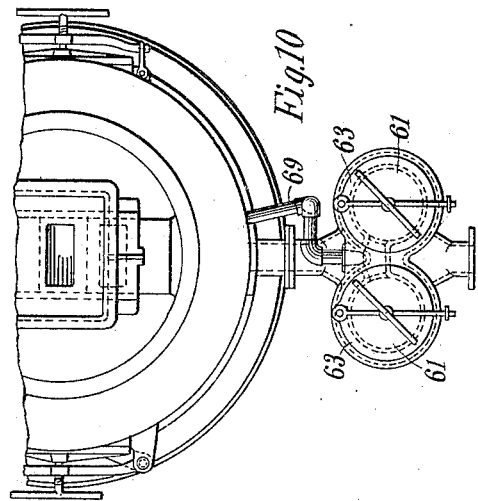
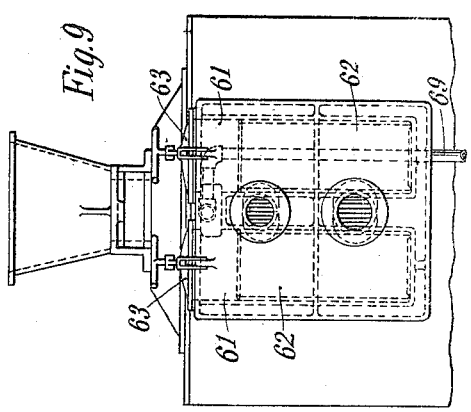
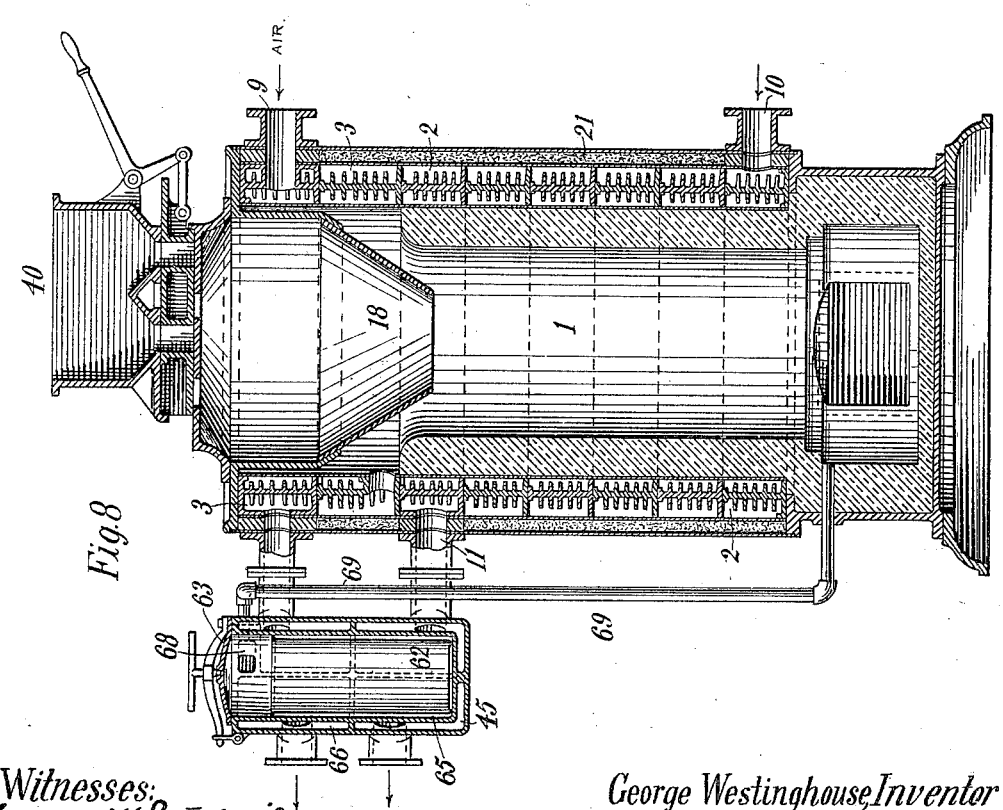
Witnesses:
George Westinghouse, Inventor
by Charles A. Terry, Atty No. 680,827. Patented Aug. 20, 1901.
G. WESTINGHOUSE.
GAS PRODUCER.
(Application filed Jan. 15, 1901.)
(No Model.) 5 Sheets—Sheet 5.

Witnesses:

George Westinghouse, Inventor by Charles A. Terry, Att'y

UNITED STATES PATENT OFFICE.

GEORGE WESTINGHOUSE, OF PITTSBURG, PENNSYLVANIA.

GAS-PRODUCER.

SPECIFICATION forming part of Letters Patent No. 680,827, dated August 20, 1901.

Application filed January 15, 1901. Serial No. 43,431. (No model.)

*To all whom it may concern:*

Be it known that I, GEORGE WESTINGHOUSE, a citizen of the United States, and a resident of Pittsburg, in the county of Allegheny and State of Pennsylvania, have invented certain new and useful Improvements in Apparatus for Producing and Utilizing Gas, of which the following is a specification.

My invention relates to a method of producing and utilizing combustible gas.

The object of the invention is to economically and continuously produce and utilize gas in connection with gas-engines and other apparatus and in quantities required to meet the varying demands, and particularly provides for the utilization of the sensible heat of the products of combustion from the gas-engine and also for the conservation of the heat of convection of the produced gas in such a manner as to return to the producer a large portion of the so-called "waste" heat at a high temperature.

The general plan of operation may be stated to involve the utilization of the heat of the exhaust products of combustion from the gas-engine to supply heat to the producer for the generation of additional gas and to so arrange the circuits of the air and the gas employed as to apply this heat in a highly-efficient manner.

Referring first to the organization of the producer itself, it may be stated generally that the producer is constructed with an air-heating circuit adjacent to the refractory lining of the gas-producing chamber through which air is admitted to the producer and compelled to traverse a circuit so organized as to heat the air to a high temperature, while the exhaust products of combustion from the gas-engine are caused to traverse a circuit intervening between the outer wall of the producer and the air-circuit in a direction reverse to that traversed by the air. This counter-current arrangement insures the maintenance of a continuous difference in temperature between the air and exhaust-gases, and hence the greatest possible transference of heat from the exhaust-gas to the air is obtained.

Figure 2:
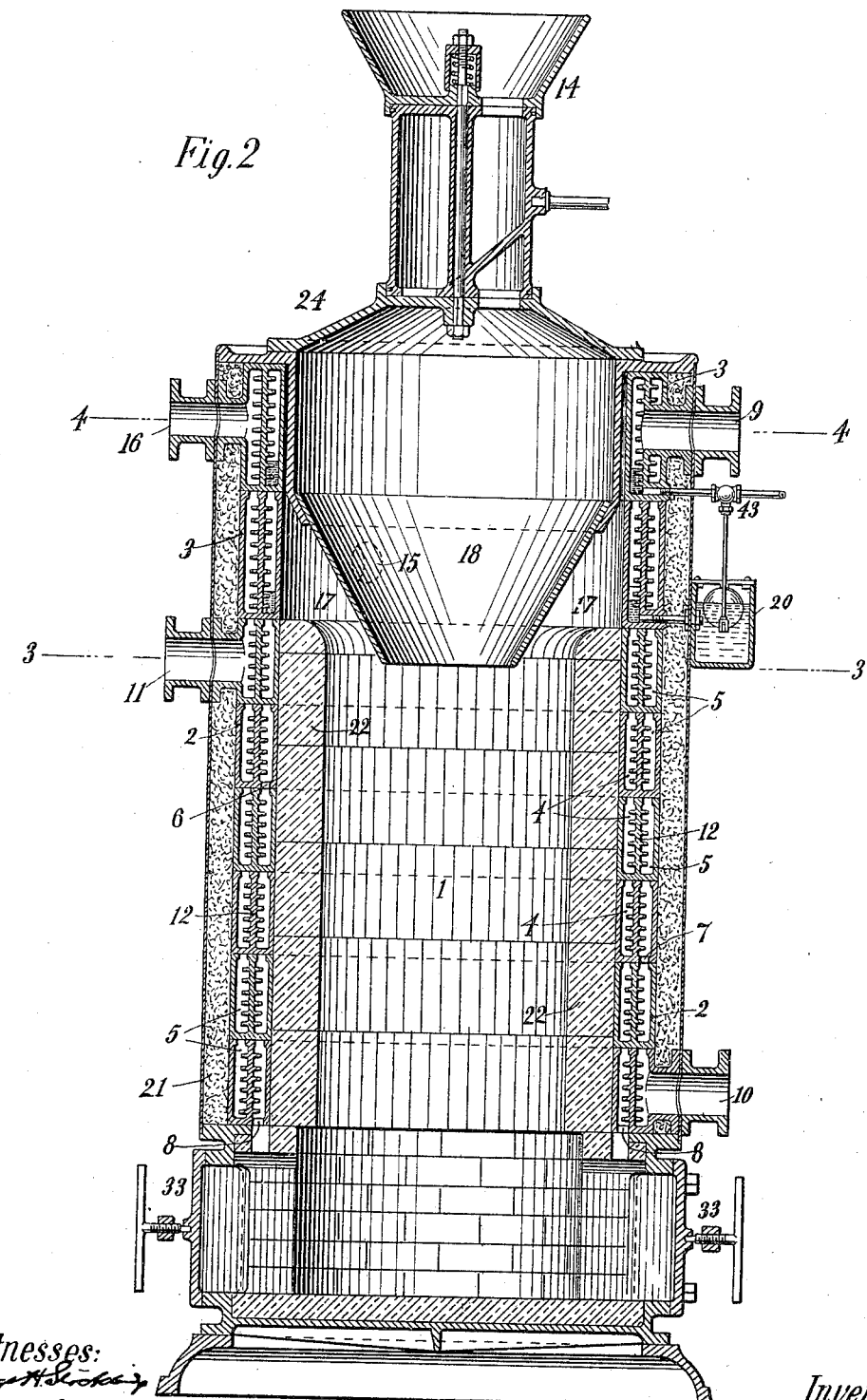
Figure 11:
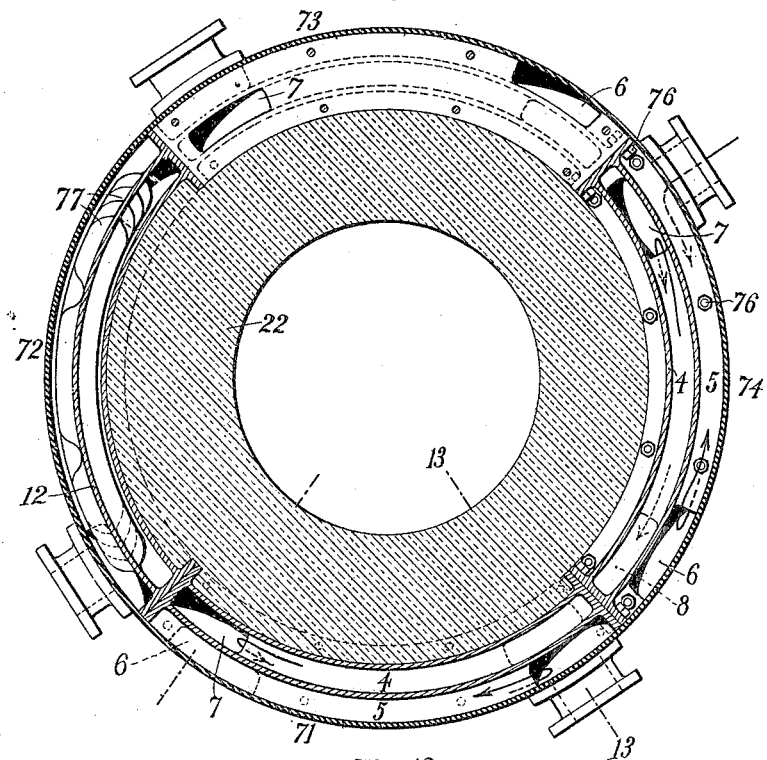
Figure 12:
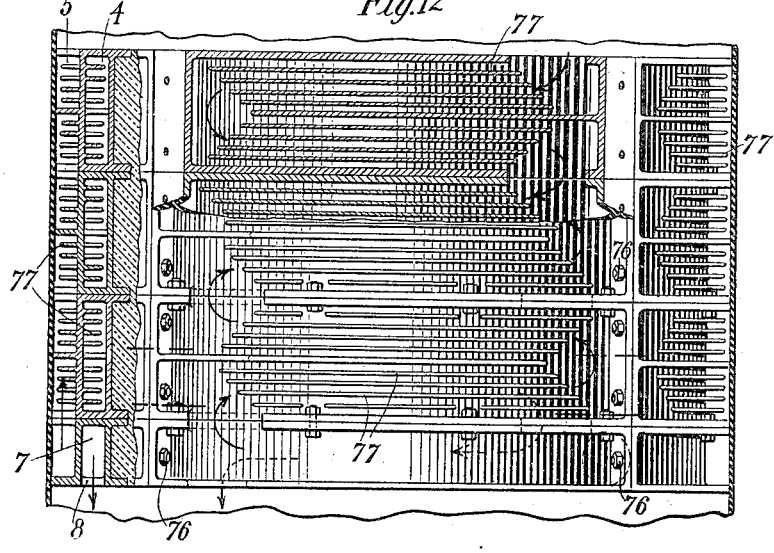
Figure 13:
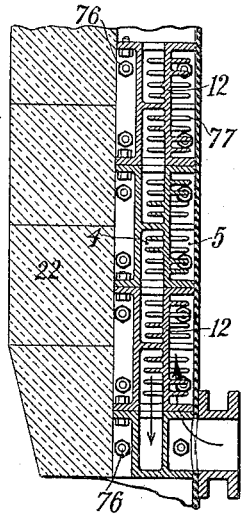

In the accompanying drawings, Figure 1 is an elevation of an apparatus embodying the principal features of the invention. Fig. 2 is a vertical section of the producer. Figs. 3 and 4 are cross-sections of the producer along the lines 3 3 and 4 4, respectively, of Fig. 2. Figs. 5, 6, and 7 illustrate details. Figs. 8, 9, and 10 illustrate an incinerator combined with the producer, and Figs. 11, 12, and 13 illustrate details.

Referring now more particularly to Fig. 2, 1 represents a cylindrical gas-producing chamber. This is inclosed by boxes or rings 2. Above these rings are placed additional similar rings 3, encircling the upper portion of the producer. The rings 2 and 3 are divided into two separate chambers or passages 4 and 5 by vertical heat-radiating walls 12, having heat-radiating ribs or projections, as shown. Air is admitted at an inlet 9 to the chamber 4 of the upper box 3 and is caused to traverse the passage through nearly a complete turn and is then caused to pass down through a port 6 to the corresponding passage in the ring or box 3 beneath it and likewise to circulate through each succeeding box 2, passing through the successive ports 6 downward until it enters the lower portion of the gas-producing chamber through ports 8. The air may be forced into the producer through the inlet 9, or the gas being withdrawn from the producer-chamber and creating a vacuum therein may be relied upon to cause the automatic entrance of the air. The products of combustion from the gas-engine enter the outer chambers or passages 5 at the inlet 10 near the bottom of the producer-shell and circulate around and upward through the ports 7 and through the successive passages, thence out at the port 11, which is connected with a stack by the pipe 38, or the gas may be led to any other suitable point. Heat-absorbing ribs or surfaces extend from the partitions 12 into the chambers 5, as shown in the drawings.

The construction of the rings containing the air and gas passages will be clear by reference to Figs. 3 and 4 more particularly. The circuit of the air is in a spiral direction downward, making nearly a complete revolution in each ring, while the exhausted gas from the engine passes in a spiral direction upward through the outer passages. The direction of circulation of the gas and air may be in the same or the opposite direction; but usually I prefer to have the two circulate through the rings in opposite directions, so as to secure a difference of temperature at every point in the circuit. The outer passages of the upper rings 3 are traversed by the hot produced gas from the producer, being admitted thereto through the port 15, and thence after making the circuit of the gas-passages the produced gas passes through an outlet 16 in the upper gas-ring and thence through suitable connections to the gas-engine 23 or to any other desired point of consumption. It will be observed that the air passing to the producer is heated not only by the radiation and convection of heat from the hot gas in the outer produced-gas passages of the upper ring 3, but also by similar radiation and convection from the hot gases in the annular space 17 between the gas-rings and the coal-reservoir 18. The heat of convection of the produced gas is also in a measure conveyed to the coal or other fuel within the reservoir 18. A shell 21, of heat-insulating material, surrounds the air and gas walls. For the purpose of further cooling the produced gas and conserving its sensible heat a continuous supply of water may be introduced into the air-passages 4 of the upper gas-rings 3, suitable dams or partitions 19 (see Fig. 5) being provided in the lower portions of the air-passages. By means of a suitable water-regulating device 20 water may be maintained in the passages at a constant level and supplied in such quantities as required. The details of a convenient construction of this device are shown in Figs. 6 and 7. The flow of water from a source 42 is automatically governed by a check-valve 43, a float 45 in the regulating device 20 serving to operate the check-valve. A pipe 44 leads from the bottom of the lower gas-ring 3 and serves to keep the level of the water in the tank 20 the same as that of the water in the lower gas-ring 3, thus causing the float to open the valve as the water falls, and vice versa. The water in the upper gas-ring overflows through the air-port into the air-passage of the lower gas-ring. In this manner a predetermined water-level may be maintained in each ring. More or less of the water is vaporized by the heat developed, and the steam thus generated passes on with the air into the producer.

The gas passing from the gas-producer enters a suitable scrubber 25, which serves to remove the tar and dust from the gas, and thence to the engine 23, where it is utilized in any well-known convenient manner for operating the engine. The exhausted products of combustion pass through the pipe 37 to the inlet 10 of the producer-wall.

An air-pump or exhaust-fan 26, which may be driven by a suitable motor 27 or in any other convenient manner, may be utilized for drawing air into the producer for the purpose of heating it preparatory to supplying gas to the gas-engine, and it may be utilized also, if desired, for forcing gas from the producer to some other point than the gas-engine when it is required for other uses.

The general method of operation is as follows: A suitable fuel—such, for instance, as anthracite coal or coke—is placed within the gas-producing chamber 1 and ignited. The valve 28 in the pipe 36, leading to the gas-engine, is closed, and the valve 29 in a pipe 35, leading from the pipe 36 to the pump 26, is also closed. The valve 30 in a pipe 31, leading to the air or stack from the pipe 32, which connects the producer-outlet 16 with the scrubber 25, is opened. A natural draft may thus be created, causing the air to enter through the air-inlet 9 and to thus pass downward through the air-passages and enter the fuel-bed at the lower portion. This air is drawn up through the fuel-bed, causing combustion, the resulting gases passing out through the gas-passages in the gas-rings 3, thence through the outlet 16 and pipes 32 and 31 to the atmosphere. If desired, air may also be admitted through the ash-pit door 33; but it is usually more desirable to have the air pass downward through the air-passages, and thus become heated, returning to the gas-producing chamber a large portion of the heat radiated through the inner refractory wall 22. Instead of starting combustion in the gas-producing chamber through the pipe 31 the valve 30 may be closed and the valve 29 opened, and the exhaust-fan may then be put in operation and air drawn through the producer, thence through the scrubber 25, pipe 35, and discharged into the air through the outlet $35^a$ of the exhaust-fan. When the fuel in the gas-producing chamber is sufficiently hot for gas-making, the valve 29 may be closed and the valve 28 opened, thus making a direct connection with the gas-engine cylinders by means of the pipe 36. The gas-engine may now be started, and gas will be withdrawn from the producing-chamber, thus drawing air into the producer through the opening 9 and the air-passages in the hot rings. Gas will thus be made in such quantities as required by the varying load or gas consumption of the gas-engine. The exhaust from the gas-engine will be discharged into the pipe 37, and thence into the exhaust-gas passages in the lower portion of the producer, and passing upward escape through the outlet 11, as already described. Coal, coke, or other material to be converted into gas is fed into the producer through the hopper 14, which may be of any convenient construction.

If it is desired to produce more gas than is required by the gas-engine, the exhaust-fan 26 may also be put in operation and the valve 29 opened, thus causing a greater entrainment of air into and through the producer, and the gas thus made in excess of the gas-engine requirements may be conducted by means of the pipe $35^a$ to other points of consumption.

The exhaust-fan 26 is provided with a by-pass 39, in which is placed the valve 50, which is operated by the pressure-regulating device 51. By this means there will be no interruption of the supply to the engine, as the pressure-regulating device may be set at such a point that any diminution in the tension of the gas in the pipe 36 below that which is suitable for the operation of the gas-engine will open the by-pass valve 50, and thus neutralize the pumping effect of the fan.

If desired, air may be forced into the producer instead of being drawn into it, as described. This may be readily accomplished by means of a suitable air-pump or blower attached to the air-inlet 9 of the producer, as indicated in dotted lines in Fig. 1. This latter construction permits the forcing into the producer of any desired amount of air, and therefore of the production of gas at any rate required in excess of the requirements of the engine.

In the organization shown in Fig. 8 there is shown an attachment for incinerating garbage and other organic waste and utilizing the volatile constituents thereof in the producer. These constituents will usually consist of moisture and fats or oils, both of which are useful for the production of gas and, moreover, would be obnoxious unless decomposed by subjecting them to a high temperature. I have shown a convenient means of utilizing a portion of the heat of the system for expelling from the waste materials the volatile constituents and passing them through the fuel-bed and leaving the non-volatile portions in such condition as to be conveniently transferred to the producer and used in the generation of additional gas.

In the drawings, 61 represents a distilling or drying chamber into which the waste materials are charged, preferably by means of removable cans 62, which may be placed in the chamber through a removable top 63. The chamber 61 is surrounded by an annular passage, which may be divided into two compartments 65 and 66, one of which, 65, is traversed by exhaust products from the gas-engine after they have traversed the exhaust-gas passages of the producer, while the other, 66, is traversed by the hot produced gases passing from the producer to the scrubber or engine. The connections of the passages will be evident from the drawings without further detailed description. The volatile products from the waste materials escape from the chamber 61 through passages 68 at the top and pass downward through pipe 69 and thence into the ash-pit of the gas-producing chamber. In practice it may be desirable to employ two similar drying or distilling chambers 61, as shown in plan, Figs. 9 and 10, the hot gases being caused to circulate around both chambers. Such a construction permits a convenient alternation of charging by inserting and removing cans 62.

Different methods of construction of the wall containing the air and gas passages may be adopted, but that shown in the drawings and illustrated more in detail in Figs. 11, 12, and 13 is very effective. The rings are here shown as being made in four sections 71, 72, 73, and 74, the abutting ends of the sections being fitted together and fastened by bolts 75 and 76. Radiating ribs or flanges 77 extend into both the air and gas passages, being cast integral with the central division-wall 12. The outer shell or walls may be integral with the central wall 12, as in Fig. 2, or the central wall and the ribs 77 may be cast as one structure and shells afterward placed within and outside these central walls, so as to form the two sets of passages, as indicated in Figs. 11, 12, and 13. The consecutive rings from bottom to top may be bolted together, as shown.

In Figs. 11, 12, and 13 I have shown several air and gas passages arranged in multiple—that is to say, an air-passage and a gas-passage extends through each superposed set of segments or sections 71, 72, 73, and 74. In such construction the air will pass from the top downward to and fro in the respective segments and pass into the furnace as before; but inasmuch as there are multiple passages for the air a greater amount of air may be delivered through the jacket. Likewise the gas passes upward through passages in the corresponding segments in multiple, and consequently a larger amount of gas may pass in a given time than where a single passage is provided. The gas-passages are shown as being so arranged that the gas will enter at one edge of the box and pass around the end of a division-wall 78, and thence back to the entering edge of that segment and upward into the next segment, and so on. The air-passages are similarly arranged, but it may be advantageous to have the air-ports upon the opposite edge of the segment from the gas-ports. A distributing-pipe 79 receives the gas and delivers it into the several segments, and a similar distributing-pipe may be provided for passing the air into the several air-passages.

It is important that the air and gas passages are contiguous to each other, so that the heat from the exhaust products of combustion shall be communicated to the air, and this is usually best accomplished by having the two passages not only contiguous, but so connected that the direction of circulation of the air is opposite to that of the hot products of combustion. It is also desirable to conserve to as great an extent as conveniently practicable the heat carried by the produced gas. The organization shown in the drawings serves to illustrate one of several different ways of accomplishing these results.

I claim as my invention—

1. The combination of a gas-engine, a producer, having two passages in its inclosing wall, means for passing the exhaust products of combustion from the engine through one passage and the air-supply of the producer through the other passage, thereby raising the temperature of the air by the heat contained in the exhaust products of combustion, and means for passing the air thus heated upward through the fuel-bed of the producer.

2. The combination of a gas-engine, a producer, means for passing the exhaust products of combustion from the gas-engine into and through a jacket embracing the producer, and means for forcing air into the producer through a jacket adjacent to the first-named jacket.

3. The combination with a gas-engine and the refractory wall surrounding the fuel-chamber of a gas-producer, of an air-jacket surrounding the refractory wall, means for securing an enforced circulation of air through the jacket and into the producer, and means for passing the exhaust from the gas-engine into proximity to the wall of the fuel-chamber.

4. The combination with a gas-engine and producer, of gas-passages embracing the producer, means for passing hot exhaust products from the gas-engine through such passages, and means for transmitting heat therefrom to the air entering the producer.

5. The combination in a gas-producer, of a producing-chamber, an inclosing wall for maintaining a high temperature in the producer, and two open passages surrounding the wall, one for the circulation of hot air into the producer and the other for receiving hot gases.

6. The combination of a gas-engine, a gas-producer, a passage for the exhaust-gas from the engine surrounding the gas-producing chamber, and an air-passage intervening between the exhaust-passage and the gas-producing chamber.

7. The combination with a gas-engine, of a gas-producer having air and gas passages surrounding the fuel-bed, means for passing air in one direction through the air-passages, and means for passing the hot products of combustion from the engine through the gas-passages in the opposite direction.

8. The combination of a gas-engine, a producer for supplying gas for the operation of the engine, air and gas passages enveloping the fuel-bed of the producer, the gas-passages being contiguous to the air-passages, connections from one end of the air-passages to the atmosphere and from the other end thereof to the lower portion of the fuel-bed, and connections from the gas-engine exhaust to one end of the gas-passages, substantially as described.

9. A gas-producer consisting of a fuel-compartment, a refractory lining therefor, rings embracing the lining constructed with two passages respectively forming continuous air and gas passages whereby hot gases passing through one set of passages impart heat to air passing through the other set of passages.

10. In a gas-producer, the combination of a gas-producing compartment, its wall of refractory material, encircling rings of iron having annular division-walls forming two compartments, radiating lugs extending into the compartments, and an outer shell or covering of refractory or heat-retaining material surrounding said rings.

11. In a gas-producer, the combination with the wall of refractory material, of a shell of cast-iron consisting of superposed rings having vertical division-walls forming each ring into two compartments, and connections from the respective compartments of each ring to the corresponding compartments of the adjacent rings whereby continuous passages are formed therethrough.

12. The combination with the refractory wall of a gas-producer, of heating and heat-imparting passages surrounding the same and constituting, respectively, air and gas passages, the gas-passage surrounding the air-passage.

13. In a gas-producer, the combination of the refractory lining of the producer, a wall encircling the producer provided with two passages, one for extracting heat from hot gases traversing the same and the other for imparting heat to air on its way to the producer, and a third compartment leading from the upper portion of the producer to the outlet thereof whereby heat is extracted from the produced gas and imparted to the entering air, substantially as described.

14. In a gas-producer, the combination of an annular passage for admitting air to the producer, a gas-passage for receiving hot products of combustion for heating the air-passage, means for maintaining a supply of water in the air-passage, and automatic means for regulating the amount of water thus maintained, substantially as described.

15. The combination with a gas-producer and gas-engine and means for passing products of combustion from the gas-engine into heat-radiating relation to the producer, of an incinerator, and means for heating the incinerator by the hot gases from the producer, thereby both cooling the gas and utilizing the heat.

16. The combination with a gas-engine, of a gas-producer, means for supplying gas from the producer to the gas-engine, and means for passing exhaust products of combustion through a jacket surrounding the producer.

Signed at New York, in the county of New York and State of New York, this 12th day of January, A. D. 1901.

GEO. WESTINGHOUSE.

Witnesses:
WM. H. CAPEL,
HUBERT C. TENER.